US006712278B2

(12) United States Patent
Livingston et al.

(10) Patent No.: US 6,712,278 B2

(45) Date of Patent: Mar. 30, 2004

(54) ON-PREMISES RESTAURANT COMMUNICATION SYSTEM AND METHOD

(75) Inventors: James Livingston, Hickory Creek, TX (US); Russell P. Blink, Plano, TX (US); Kenneth J. Lovegreen, Lake Kiowa, TX (US)

(73) Assignee: Long Range Systems, Inc., Dallas, TX (US)

(*) Notice: Subject to any disclaimer, the term of this patent is extended or adjusted under 35 U.S.C. 154(b) by 0 days.

(21) Appl. No.: 10/156,310

(22) Filed: May 28, 2002

(65) Prior Publication Data

US 2003/0213840 A1 Nov. 20, 2003

Related U.S. Application Data

(63) Continuation-in-part of application No. 10/150,680, filed on May 17, 2002.

(51) Int. Cl.[7] ................................................ G06K 19/06

(52) U.S. Cl. ....................................... 235/492; 235/380

(58) Field of Search .................................. 235/380, 492

(56) References Cited

U.S. PATENT DOCUMENTS 4,569,421 A * 2/1986 Sandstedt .................... 186/39
4,722,053 A * 1/1988 Dubno et al. ................. 463/42
5,838,798 A * 11/1998 Stevens, III ................. 705/21
5,845,263 A * 12/1998 Camaisa et al. .............. 705/27
5,912,743 A * 6/1999 Kinebuchi et al. .......... 358/442
5,979,604 A * 11/1999 Pinna et al. .................. 186/39
6,115,695 A * 9/2000 Kern ........................... 705/23
6,415,555 B1 * 7/2002 Montague ................... 52/36.2

* cited by examiner

*Primary Examiner*—Mark Tremblay

(74) *Attorney, Agent, or Firm*—Steven W. Smith

(57) ABSTRACT

An on-premises restaurant communication system for communicating a particular customer's table location to a food server at a central service counter. A communication device is mounted on each of the tables in the restaurant, and has a unique table identifier stored therein. The particular customer is provided with a data token on which a customer number is encoded. The customer selects a table and inputs the token in the communication device mounted on the selected table. In response to reading the customer number, the communication device sends a message to the central service counter that includes the unique table identifier and the customer number. There, the table identifier and the customer number are extracted from the received message, and a table location is determined and provided to the food server.

19 Claims, 7 Drawing Sheets

ON-PREMISES RESTAURANT COMMUNICATION SYSTEM AND METHOD

RELATED APPLICATIONS

This application is a continuation-in-part of co-pending and co-owned U.S. patent application Ser. No. 10/150,680, entitled, "On-Premises Paging System Utilizing Mounted Pagers Having a Data Input Device," filed May 17, 2002 in the names of James Livingston, Russell P. Blink, and Kenneth J. Lovegreen.

BACKGROUND OF THE INVENTION

1. Technical Field of the Invention

This invention relates to on-premises paging and communication systems. More particularly, and not by way of limitation, the present invention is directed to an on-premises restaurant communication system and method that utilizes communication devices mounted one each table in the restaurant, each communication device having a data input device through which a customer identifier number may be input to the communication device.

2. Description of Related Art

Many restaurants use a service method in which customers order their food at a central service counter, and then select their own table where they sit and wait for their food to be prepared. The customers may give their names to a server at the central counter, or the server may give each customer a number that will be called when the customer's food is ready. In either case, when the food is ready, a public address (PA) system is used to call out the name or number of the customer whose food is ready. The called customer then proceeds to the central counter and picks up his food. A disadvantage of the central service counter method is that many noisy PA system announcements must be made within the restaurant, thereby making the restaurant a less pleasant place to eat.

In other restaurants, customers must wait in a waiting area for a table to become available before they can sit down and order their food from a waitperson. Some of these restaurants utilize an on-premises paging system to alert waiting customers when their table is available. When the customer first arrives at the restaurant, he is given an on-premises pager by the receptionist who then enters the code number of the pager into the on-premises paging system. When the table is available, an on-premises paging transmitter pages the customer's pager with the proper code number, and the customer is alerted. A disadvantage of this paging method is that customers sometimes leave the restaurant before their table is ready, and they take their assigned pager with them. The loss of such pagers can be very expensive to the restaurant.

Some restaurants using the central service counter method have also attempted to utilize on-premises pagers to alert customers when their food is ready rather than using the noisy PA system. While this approach has been successful at lowering the noise level, it still suffers from the disadvantage that expensive pagers are lost.

In still other restaurants, the customer orders his food at a central service counter, and is given some sort of identifier such as a number or letter printed on a block or other device. The customer selects a table, places the identifier on his table, and waits for his food to be prepared. When the food is ready, a server from the restaurant brings the food to the table rather than requiring the customer to return to the central service counter to pick it up. However, this is a very inefficient process because the server must wander through the restaurant until he sees the proper identifier on a customer's table. When the restaurant is crowded, this can take a considerable amount of time. In addition, the process is unnerving for the customer who sees a server wandering around with a food order, but does not know whether the order is his. The customer may think that the order is his, and the server just does not see his identifier. This is made even worse when the food order is what the customer ordered, but it is actually intended for someone else. It would be advantageous, therefore, to have an on-premises communication system for restaurants with central service counters that solves these problems. The present invention provides such a system.

SUMMARY OF THE INVENTION

In one aspect, the present invention is directed to an on-premises restaurant communication system for communicating an identifier for a customer's table to a central service counter. The system may include means in the central service counter for encoding a data token with a customer identifier number that is provided to the customer when the customer places a food order. The system also includes a communication device mounted on the customer's table. The communication device includes a data memory that stores the table identifier; data input means for inputting the data token and extracting the customer number therefrom; and a communication transmitter that transmits a message containing the table identifier and the extracted customer number. The central service counter includes a communication receiver that receives the message and extracts the customer number and the table identifier therefrom; and a user interface that receives the extracted customer number and table identifier from the communication receiver and informs a food server of the table identifier for the customer's table. The food server can then deliver the customer's food order without wandering around the restaurant looking for an identifier.

In another aspect, the present invention is directed to a restaurant communication device that includes means for mounting the device on a table in the restaurant; means for storing a table identifier; and means for receiving a customer number from a customer. The device also includes means responsive to receiving the customer number, for sending a message that includes the table identifier and the customer number to a central service counter.

In yet another aspect, the present invention is directed to a method of providing a table location where a particular customer is sitting to a food server located at a central service counter in a restaurant having a plurality of tables. The method includes the steps of mounting a communication device on each of the plurality of tables in the restaurant; storing a unique table identifier for each of the plurality of tables in the communication device mounted on each table; and providing the particular customer with a data token on which a customer number is encoded. After the customer selects a table, the method includes reading the particular customer's customer number with a data input device at a particular communication device mounted on the selected table; and sending a message from the particular communication device to the central service counter in response to reading the particular customer's customer number. The message includes the unique table identifier and the particular customer's customer number. The central service counter extracts the unique table identifier and the particular customer's customer number from the received message; determines a table location from the extracted table identifier; and provides the food server with the table location for the particular customer.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
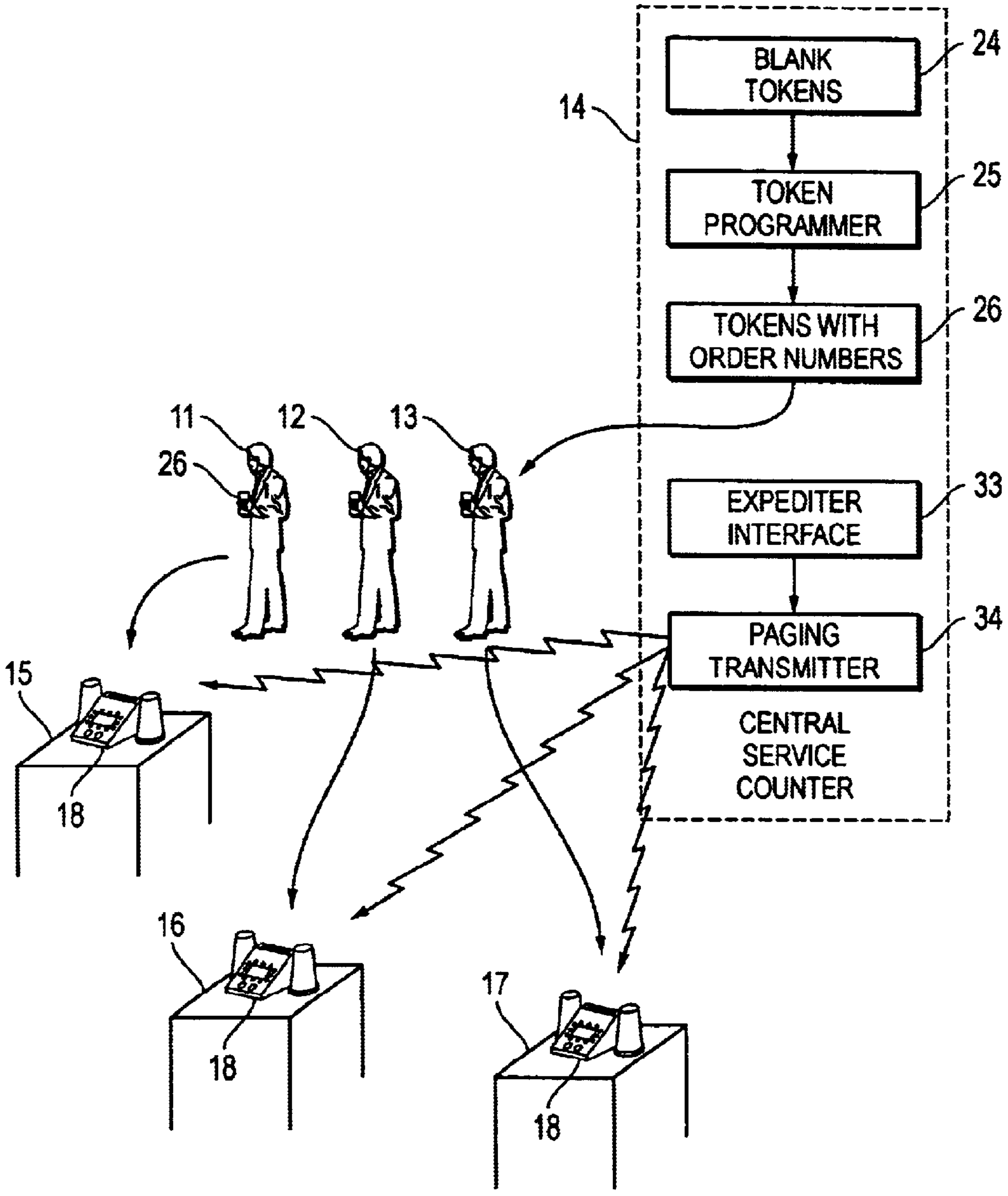
FIG. 1 is a simplified block diagram of a first embodiment of the system of the present invention.

FIG. 1 is a simplified block diagram of the preferred embodiment of the on-premises paging system of the present invention. The present invention is an on-premises paging system that utilizes pagers mounted at different locations on the premises, each pager having a data input device through which a customer identifier may be input to the pager. In restaurants using the central service counter method, customers 11–13 order their food at a central service counter 14, and then they select their own table 15–17 where they sit and wait for their food to be prepared. In the system of the present invention, an on-premises pager 18 is permanently mounted on each table. As shown and described in FIG. 2, each pager includes a data input device 19 such as a card reader, bar code scanner, keypad, etc. Each pager also includes a display screen 20, a set of alerting lights 21, a speaker 22, and a customer acknowledgment/reset button 23.

When the customer places an order at the central service counter 14, the server taking the order may place a blank data token 24 into a token programmer 25 which encodes a customer number on the token. Alternatively, the tokens may be preprogrammed, in which case the token programmer is not required. The server then gives the customer a programmed data token 26 and instructs them to input the data on the data token into the pager 18 mounted on the table that they select. The customer number is then stored in a customer-number memory in the pager. Thereafter, when the customer's order is ready, the customer number is broadcast by an on-premises paging transmitter, and the pager at the customer's table alerts the customer.

Figure 2:
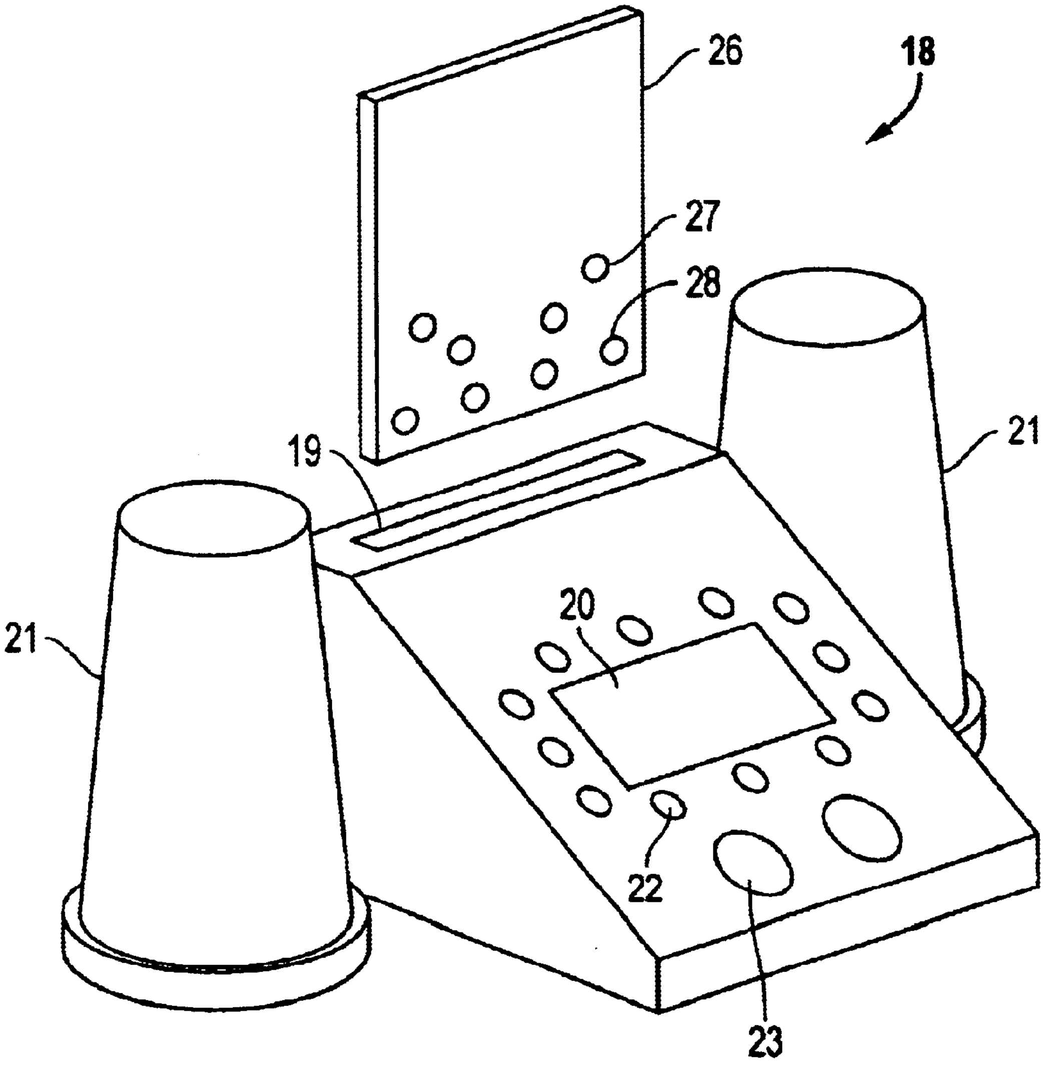
FIG. 2 is a perspective view of a first embodiment of a pager/data reader of the present invention.

FIG. 2 is a perspective view of the preferred embodiment of the pager 18. In the description herein, the pagers may be referred to as being mounted in fixed locations. However, it will be understood by those skilled in the art that the owner of the restaurant may have the means to relocate the pagers from one location to another. An essential feature of the pager, however, is that customers do not hand-carry the pagers, and customers cannot remove the pagers from their mounted locations without tools. In the preferred embodiment, the pagers are table-top pagers fixedly mounted to the tables in the restaurant.

In the preferred embodiment, the data tokens are preprogrammed plastic cards 26 having a series of holes 27 which are used to encode different customer numbers. A registration hole 28 is used to ensure that the data token is inserted into the data input device in the correct orientation. The data input device decodes the customer number by reading the pattern of holes. In one embodiment, when the card is placed in the data input device, a series of LEDs shine through the holes, and the light from each hole is detected by a series of detectors on the other side of the card. The presence of light is a logical value while the absence of light is an inverse logical value. Together, the values are interpreted as a customer number.

In other embodiments, the server may give the customer a plastic card with a magnetic strip that records the customer number. In this case, the data input device 19 in the pager is a magnetic card reader. Alternatively, the data input device in the pager may be a bar code reader, and the server may give the customer a receipt that has a bar code imprinted thereon containing the customer number. Other methods of inputting the customer number may also be utilized, such as optically read devices, smart cards, Radio Frequency Identifier (RFI) tokens, voice recognition programs, or mechanical bumps, holes, or slots. The data input device 19 may read the customer number as the card, token, or receipt is slid into, slid out of, and/or swiped across the data input device. In another embodiment, the customer is told or given a number at the central service counter, and the customer enters the number in the pager 18 through a keypad or microphone.

The display screen 20 may be an LCD or LED display, or any other display suitable for displaying a customer number. In the preferred embodiment, the display screen displays the customer number when the number is input into the pager, and then displays the number again when the customer number is paged. When the page is received, the alerting lights 21 flash to get the attention of the customers at the table. The speaker 22 may also provide an audible indication of the incoming page. When the customer recognizes his customer number on the display screen, he pushes the acknowledgment/reset button 23 which ends the alert and erases his number from the customer-number memory in the pager.

Figure 3:
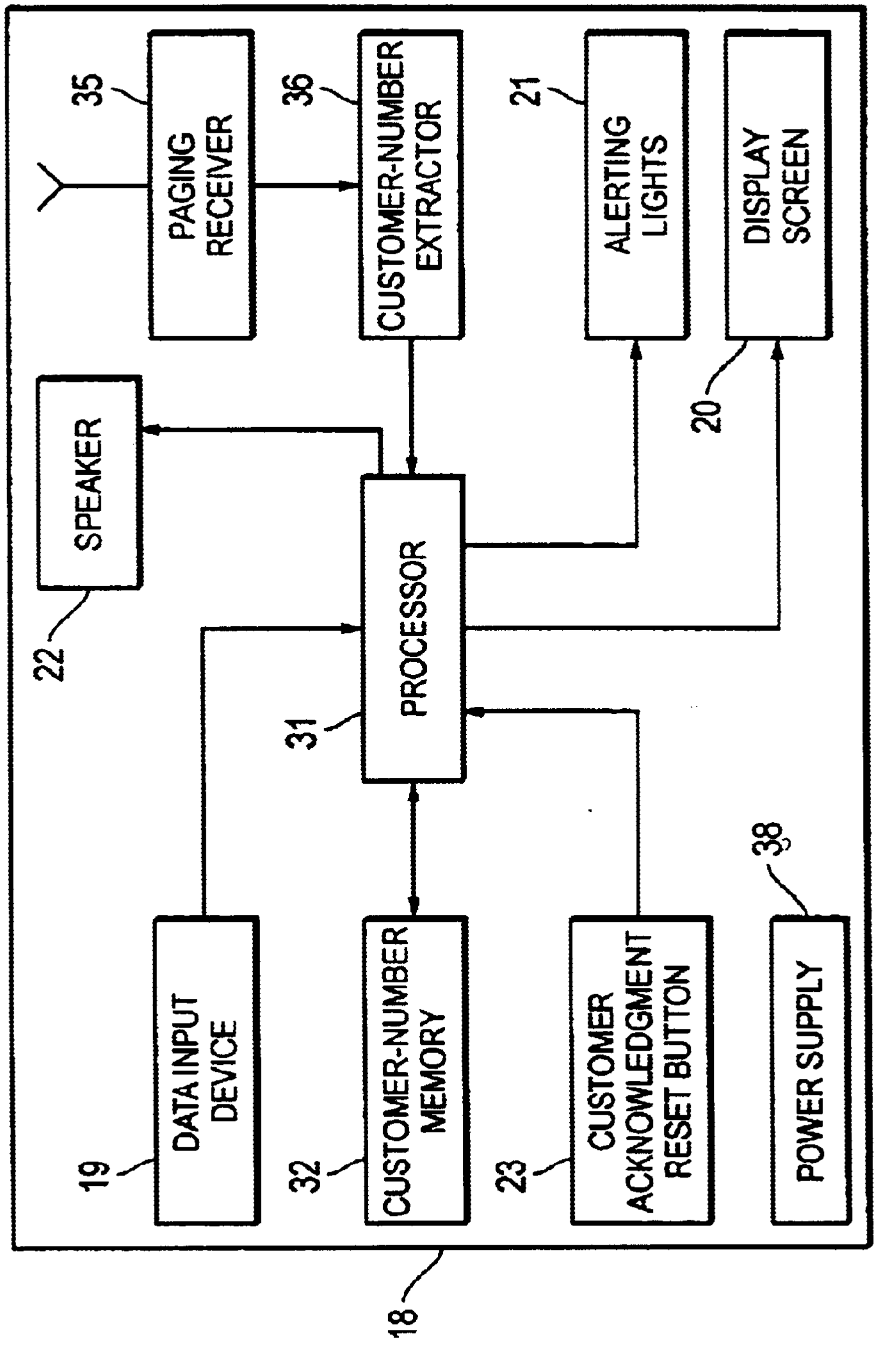
FIG. 3 is a simplified functional block diagram of the first embodiment of the pager/data reader of the present invention.

FIG. 3 is a simplified functional block diagram of the preferred embodiment of the pager/data reader 18 of the present invention. When the customer 11–13 selects a table 15–17, the data input device 19 is utilized to input the customer's identifier number into the pager 18. A processor 31 informs the customer of his customer number on the display screen 20, and stores the customer number in a customer-number memory 32. Additional members of the customer's party can then scan their tokens into the pager. The customer-number memory can store multiple customer numbers, and in the preferred embodiment, the customer-number memory can store up to sixteen (16) customer numbers. Each member of the party is informed of his/her customer number, and each customer number is stored in the customer-number memory.

When a particular customer's order is ready, the expediter at the central counter 14 (FIG. 1) uses an expediter interface 33 to use a paging transmitter 34 to broadcast a paging message that includes the assigned customer number. The pagers 18 mounted on each table receive the paging message through a paging receiver 35. A customer-number extractor 36 extracts the broadcast customer number from the received message and sends it to the processor 31. The processor of each particular pager then determines whether the broadcast customer number is stored in its customer-number memory. The particular pager that determines that the broadcast customer number is stored in its memory then alerts the customers at its table using the alerting lights 21 and the optional speaker 22, and then displays the broadcast customer number on the display screen 20. The customer acknowledgment/reset button 23 enables the customer to indicate that the customer has received the message. The pager then turns off the lights, clears the display screen, and deletes the customer number from the customer-number memory 32. The pager is powered by a power supply 38 which may be, for example, one or more batteries.

Figure 4:
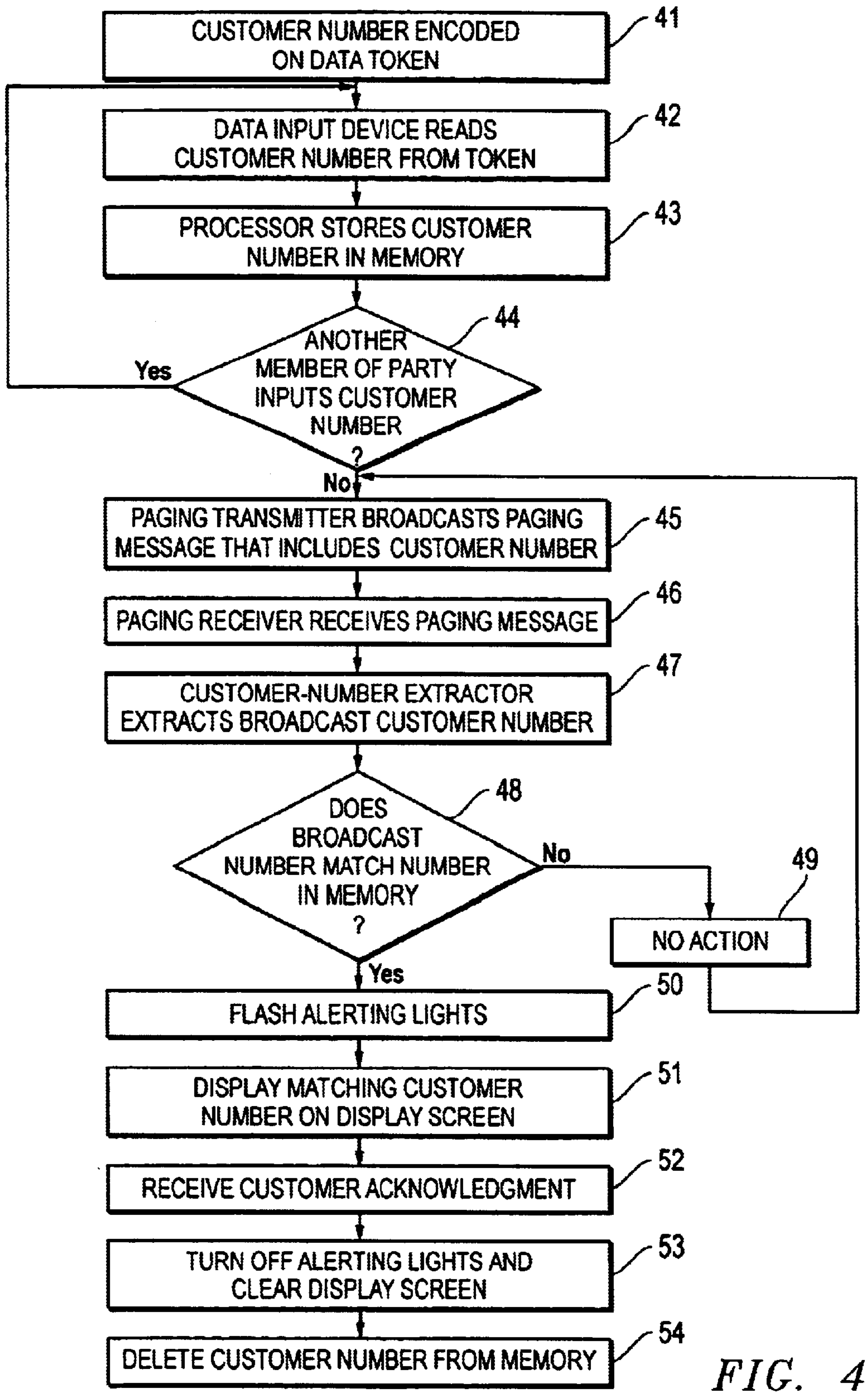
FIG. 4 is a flow chart of an exemplary process performed by the pager/data reader when receiving a paging message and alerting a customer.

FIG. 4 is a flow chart of an exemplary process performed by the pager/data reader 18 when receiving a paging message and alerting a customer. At step 41, a customer number may be encoded on a data token 26 at the central service counter 14. Alternatively, a pre-recorded data token is provided to the customer. The customer then takes the token to a table, and the data input device 19 reads the customer number from the token at step 42. At step 43, the processor 31 stores the customer-number in the customer-number memory 32. The number may be displayed at this time on the display screen 20 to provide feedback to the customer that the number has been entered. At step 44, it is then determined whether another member of the dining party inputs a customer number through the data input device. If so, the process returns to step 42 where the data input device reads the customer number from the token, and the processor stores the customer-number in the customer-number memory at 43. When all of the customer numbers at the table have been entered, the pager waits for a broadcast paging message.

At step 45, the paging transmitter at the central service counter broadcasts a paging message that includes a customer number. At 46, the paging receiver 35 receives the message, and the customer-number extractor 36 extracts the broadcast customer number at 47. At step 48, the processor 31 determines whether or not the broadcast customer number matches any of the customer numbers stored in its memory 32. If not, the process moves to step 49 where no action is taken. The process then returns to step 45 where the pager continues to wait for a broadcast paging message. If the broadcast customer number matches one of the customer numbers stored in its memory at step 48, the process moves to step 50 where the alerting lights 21 are flashed to get the attention of the customers at the table. At step 51, the customer number matching the broadcast customer number is displayed on the display screen 20, and at 52, the customer having the displayed customer number pushes the customer acknowledgment/reset button 23. At 53, the processor turns off the alerting lights and clears the display. At 54, the customer number is then deleted from the customer-number memory. This process continues until all of the customers at the table have been alerted.

In this manner, the necessity to make noisy PA announcements is eliminated. The loss of expensive pagers is also eliminated since the pagers are permanently mounted on the tables, and the customers are given only plastic cards costing a few cents, or bar-coded receipts which essentially cost nothing.

Figure 5:
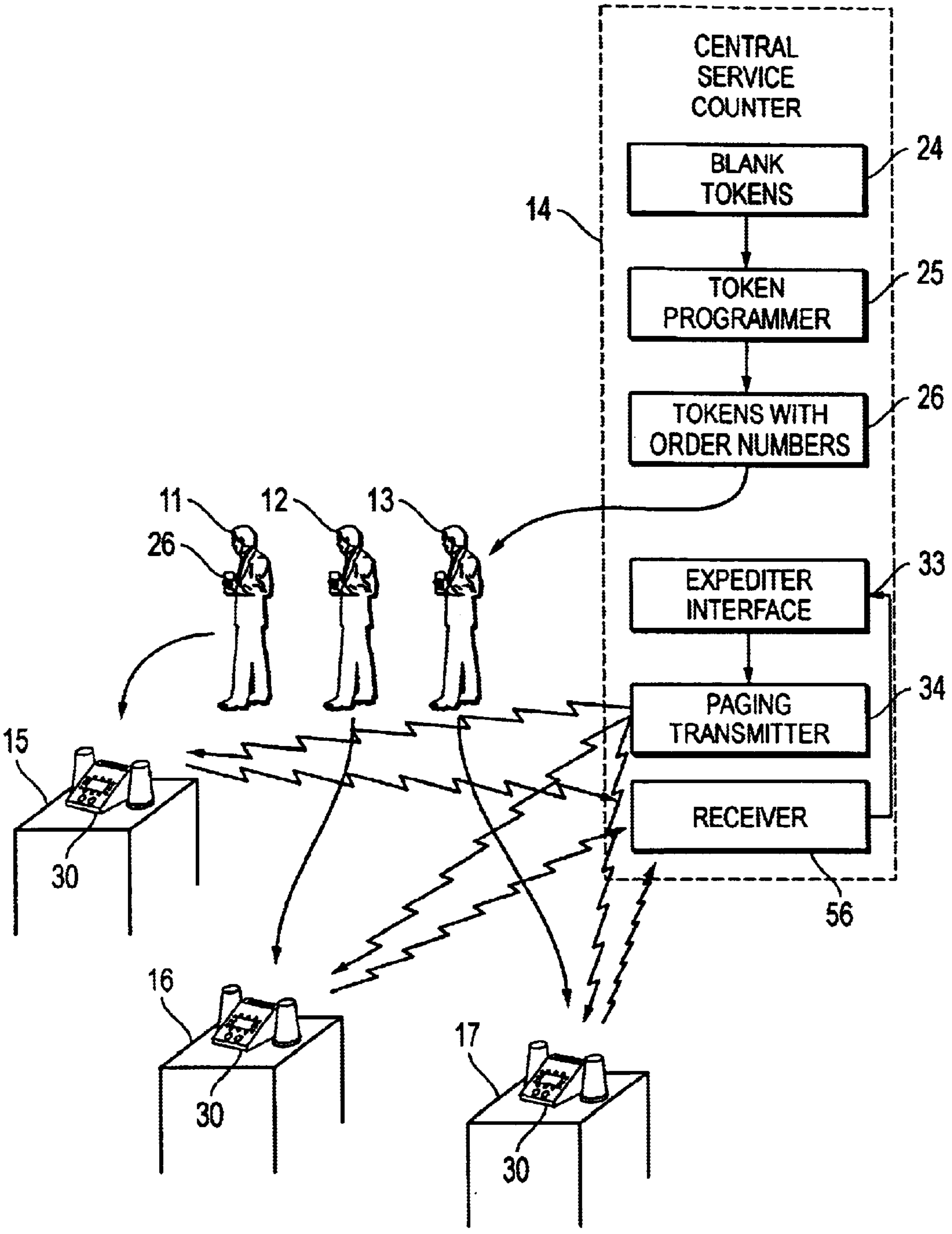
FIG. 5 is a simplified block diagram of a second embodiment of the system of the present invention.

FIG. 5 is a simplified block diagram of a second embodiment of the system of the present invention. This embodiment is intended for use in restaurants in which the customer orders his food at a central service counter, and is currently given some sort of identifier such as a number or letter printed on a block or other device. The customer selects a table, places the identifier on his table, and waits for his food to be prepared. When the food is ready, a server from the restaurant brings the food to the table rather than requiring the customer to return to the central service counter to pick it up. As noted above, this existing methodology is very inefficient because the server must wander through the restaurant until he sees the proper identifier on a customer's table. When the restaurant is crowded, this can take a considerable amount of time.

In the second embodiment of the present invention, the customer is again given a data token 26 at the central service counter 14 when he places his food order. The data token has a customer number encoded thereon. The customer selects a table 15–17 within the restaurant, and inputs the data token in the data input device 19 of a communication device 30 mounted on the table. The communication device then sends a message to the central service counter with the customer number and an identification number or location of the table where the communication device is mounted. The central service counter includes a receiver 56 which receives the message and extracts the customer number and the table number where the customer is seated. The receiver 56 passes this information to the expediter interface 33. The server is then informed of the table number/location where the customer is seated, and can efficiently deliver the customer's food when it is ready.

Figure 6:
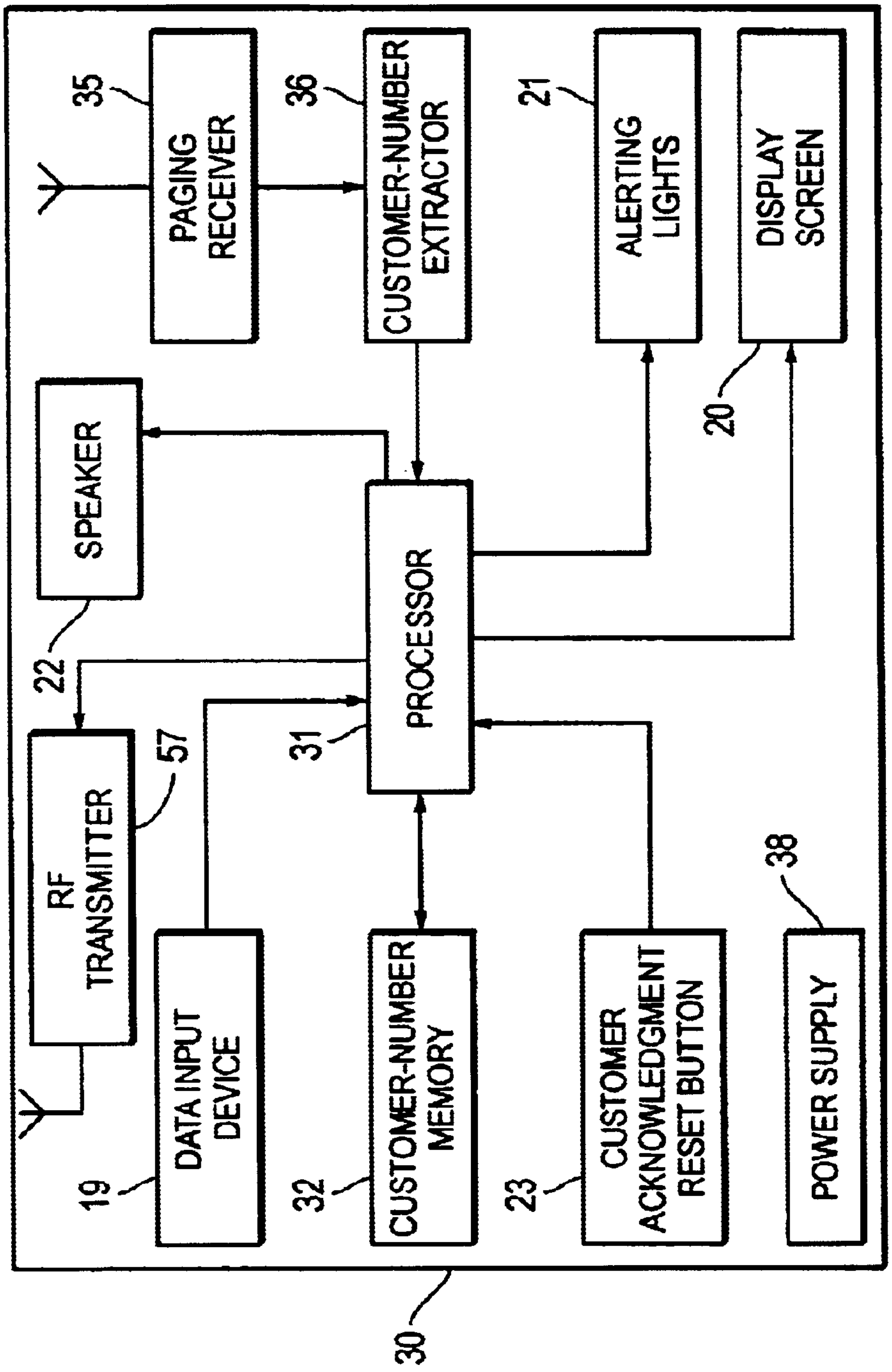
FIG. 6 is a simplified functional block diagram of a second embodiment of the pager/data reader of the present invention.

FIG. 6 is a simplified functional block diagram of a second embodiment of the communication device 30 of the present invention. In this embodiment, the communication device includes a transmitter 57. When the customer inputs his customer number through the data input device 19, the processor 31 sends the customer number and a table identifier to the transmitter 57. The transmitter then sends a message back to the central service counter 14 with the customer number and table identifier. It should be recognized that although an RF transmitter is depicted in the exemplary embodiment shown in FIG. 6, any type of communication mechanism can be utilized in practice to communicate the customer number and table number back to the central service counter. For example, this data may be communicated via RF, infrared (IR), wireline communication, and the like. In addition, it should be recognized that the communication device 30 in this embodiment requires only the data input device 19, and a communication mechanism that can acquire the customer number from the data input device and send a communication message to the central service counter with the customer number and the table identifier.

Figure 7:
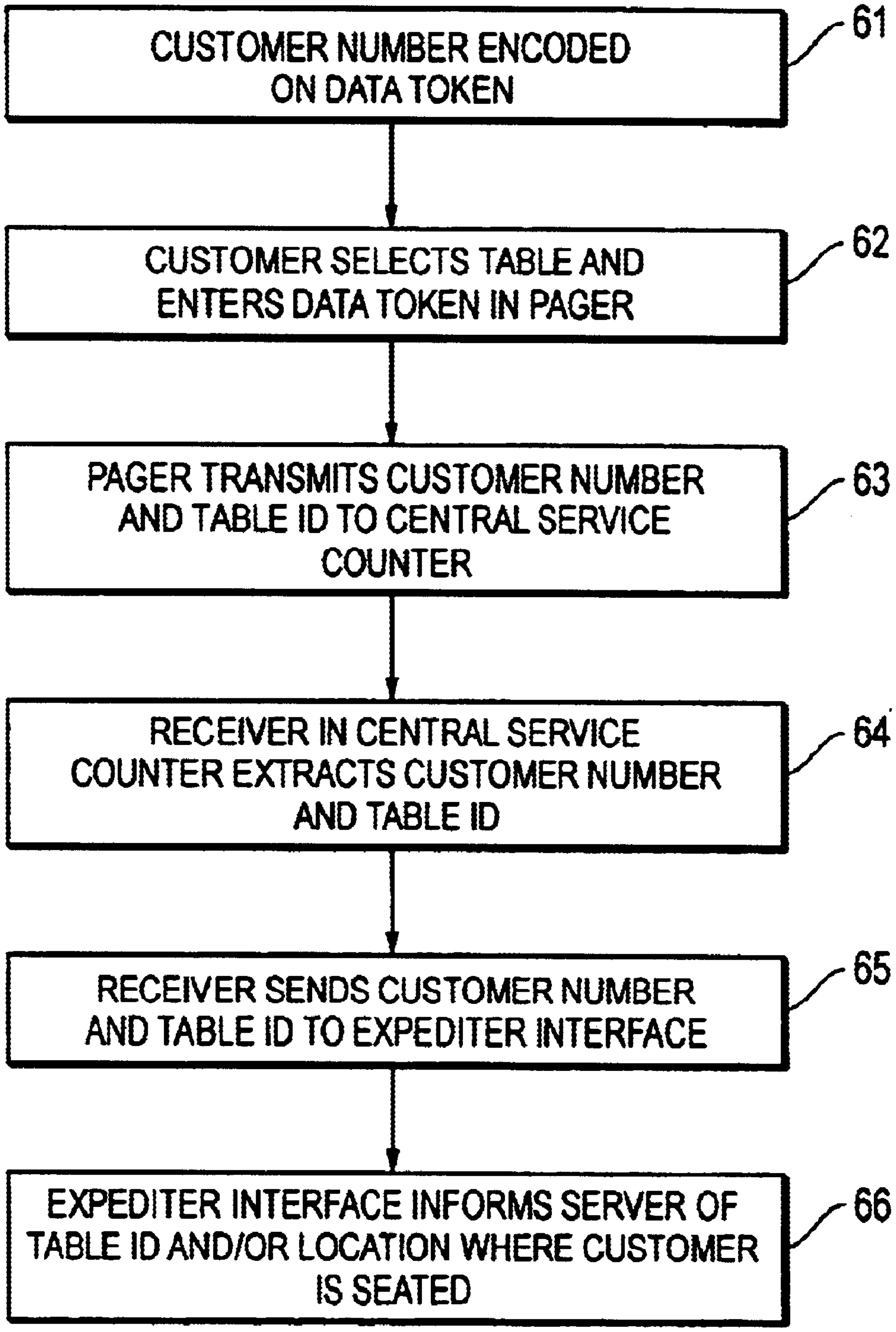
FIG. 7 is a flow chart of an exemplary process performed by the system of the present invention when informing a server of a table number where the customer is seated.

FIG. 7 is a flow chart of an exemplary process performed by the system of the present invention when informing a server of a table identifier where the customer is seated. At step 61, a data token 26 is encoded with a customer number when the customer places his food order at the central service counter 14. At step 62, the customer selects a table and enters the data token in the data input device 19 in the communication device 30 mounted on the selected table. If there are multiple customers in the party, each customer can enter a data token. The communication device is preprogrammed with the particular table identifier where the communication device is mounted. At step 63, the transmitter 57 in the communication device transmits a message to the central service counter and includes the input customer number(s) and the preprogrammed table identifier. At step 64, the receiver 56 in the central service counter receives the message and extracts the customer number(s) and the table identifier. At step 65, the extracted customer number(s) and table identifier are sent to the expediter interface 33, and at step 66, the expediter interface informs the food server of the table identifier and/or the location of the table where the customer is seated. The expediter interface may include a Graphical User Interface (GUI) that provides a video image or map of the restaurant indicating the location of the customer's table. In this way, the food server can proceed directly to the correct table.

It is thus believed that the operation and construction of the present invention will be apparent from the foregoing description. While the system, apparatus, and method shown and described has been characterized as being preferred, it will be readily apparent that various changes and modifications could be made therein without departing from the scope of the invention as defined in the following claims.

What is claimed is:

1. An on-premises restaurant communication system for communicating an identifier for a customer's table to a central service counter, said system comprising:

- means in the central service counter for encoding a data token that is provided to the customer when the customer places a food order, said encoding means encoding the token with a customer identifier number;
- data input means in a communication device mounted on the customer's table for inputting the data token and extracting the customer number therefrom;
- a data memory in the communication device that stores the table identifier;
- a communication transmitter in the communication device that transmits a message containing the extracted customer number and the table identifier;
- a communication receiver in the central service counter that receives the message and extracts the customer number and the table identifier therefrom; and
- a user interface in the central service counter that receives the extracted customer number and table identifier from the communication receiver and informs a food server of the table identifier for the customer's table.

2. The on-premises restaurant communication system of claim 1 wherein the data token is a card having a plurality of apertures forming a unique pattern therein, and the data input means in the communication device includes an optical reader that recognizes the pattern and determines the customer number therefrom.

3. The on-premises restaurant communication system of claim 1 wherein the data token includes a magnetic strip on which the customer number is magnetically encoded, and the data input means in the communication device includes a magnetic card reader that reads the magnetic strip and determines the customer number therefrom.

4. The on-premises restaurant communication system of claim 1 wherein the data token includes a bar code that encodes the customer number, and the data input means in the communication device includes a bar code reader that reads the bar code and determines the customer number therefrom.

5. The on-premises restaurant communication system of claim 1 wherein the communication transmitter in the communication device includes a radio frequency (RF) transmitter that transmits a wireless message to the central service counter.

6. The on-premises restaurant communication system of claim 1 wherein the communication transmitter in the communication device includes an infrared transmitter that transmits a wireless message to the central service counter.

7. The on-premises restaurant communication system of claim 1 wherein the communication transmitter in the communication device includes a wireline transmitter that transmits a message over a wireline connection to the central service counter.

8. The on-premises restaurant communication system of claim 1 wherein the user interface in the central service counter includes a Graphical User Interface (GUI) that provides a video image to the food server indicating the location of the customer's table in the restaurant.

9. A restaurant communication device for communicating within a restaurant, said device comprising:

- means for mounting the device on a dining table in the restaurant;
- means for storing in the device, a table identifier for the dining table;
- means for receiving a customer number from a customer; and
- means responsive to receiving the customer number for sending a message to a central food-service counter in the restaurant, said message including the table identifier and the customer number.

10. The restaurant communication device of claim 9 wherein the means for receiving a customer number is a keypad through which the customer enters the customer number.

11. The restaurant communication device of claim 9 wherein the means for receiving a customer number includes a reader for reading the customer number from a data token when the data token is presented to the means for receiving the customer number.

12. The restaurant communication device of claim 11 wherein the means for receiving a customer number is an optical reader that recognizes a pattern of apertures in an input card and determines the customer number therefrom.

13. The restaurant communication device of claim 11 wherein the means for receiving a customer number is a magnetic card reader that reads the customer number from a magnetic strip on a card presented to the means for receiving the customer number.

14. The restaurant communication device of claim 11 wherein the means for receiving a customer number is a bar code reader that reads the customer number from a bar code on the data token.

15. The restaurant communication device of claim 9 wherein the means for receiving a customer number includes means for receiving a plurality of customer numbers, and the means for sending a message to a central service counter includes means for sending a message that includes the table identifier and the plurality of customer numbers.

16. A method of providing a table location where a particular customer is sitting to a food server located at a central service counter in a restaurant having a plurality of tables, said method comprising the steps of:

- mounting a communication device on each of the plurality of tables in the restaurant;
- storing a unique table identifier for each of the plurality of tables in the communication device mounted on each table;

providing the particular customer with a data token on which a customer number is encoded;

reading the particular customer's customer number with a data input device at a particular communication device mounted on one of the plurality of tables;

sending a message from the particular communication device to the central service counter in response to reading the particular customer's customer number, said message including the unique table identifier and the particular customer's customer number;

extracting by the central service counter, the unique table identifier and the particular customer's customer number from the received message;

determining a table location from the extracted table identifier; and providing the food server with the table location for the particular customer.

17. The method of providing a table location of claim 16 wherein the step of providing the customer with a data token includes providing the customer with an optically read data card.

18. The method of providing a table location of claim 16 wherein the step of providing the customer with a data token includes providing the customer with a magnetically read data card.

19. The method of providing a table location of claim 16 wherein the step of providing the customer with a data token includes providing the customer with a receipt with a bar code printed thereon.

* * * * *